United States Patent
Forytta et al.

(10) Patent No.: US 6,953,336 B2
(45) Date of Patent: Oct. 11, 2005

(54) GAS STOVE, IN PARTICULAR FOR CAMPER VEHICLES

(75) Inventors: Karl Heinz Forytta, Wolfsburg (DE); Frank Drenkow, Braunschweig (DE); Johannes Gretencord, Rheda-Wiedenbrück (DE); Burkhard Krüper, Menden (DE); Jozef Ninc, Filakovo (SK); Erny Huberty, Walsdorf (LU); Uwe Reddigau, deceased, late of Braunschweig (DE); by Renate Reddigau, legal representative, Braunschweig (DE)

(73) Assignee: Volkswagen AG, Wolfsburg (DE)

(*) Notice: Subject to any disclaimer, the term of this patent is extended or adjusted under 35 U.S.C. 154(b) by 71 days.

(21) Appl. No.: 10/424,504

(22) Filed: Apr. 28, 2003

(65) Prior Publication Data

US 2004/0025860 A1 Feb. 12, 2004

Related U.S. Application Data

(63) Continuation of application No. PCT/EP01/12289, filed on Oct. 24, 2001.

(30) Foreign Application Priority Data

Oct. 28, 2000 (DE) .......................... 100 53 679

(51) Int. Cl.[7] .................................. F23Q 2/00
(52) U.S. Cl. .................. 431/142; 431/143; 431/206; 126/268
(58) Field of Search ................. 431/142, 143, 431/206, 344; 126/38, 268, 276

(56) References Cited

U.S. PATENT DOCUMENTS

| 2,853,126 A | * | 9/1958 | Corlet | ................ 431/344 |
| 2,890,815 A | * | 6/1959 | Corlet | ................ 431/344 |
| 6,089,218 A | * | 7/2000 | Mifune et al. | ................ 126/38 |

FOREIGN PATENT DOCUMENTS

| DE | 3619568 A1 | * 12/1987 | ................ 431/344 |
| DE | 87 12 254.5 U1 | 1/1988 | |
| DE | 36 33 809 A1 | 4/1988 | |
| DE | 42 29 819 A1 | 3/1994 | |
| EP | 0 866 276 A1 | 9/1998 | |
| EP | 0 907 054 A1 | 4/1999 | |
| FR | 2 330 961 | 6/1977 | |
| FR | 2 614 400 | 10/1988 | |
| JP | 54-123726 | 9/1979 | |
| JP | 62-202921 A | * 9/1987 | ................ 431/344 |

OTHER PUBLICATIONS

Absract for Japanese Patent Application Publication 07280247 A, Oct., 1995.*

Abstract for Japanese Patent Application Publication 55025757, Feb., 1980.*

* cited by examiner

Primary Examiner—Alfred Basichas
(74) Attorney, Agent, or Firm—Laurence A. Greenberg; Werner H. Stemer; Manfred Beck

(57) ABSTRACT

A gas stove with a burner and gas container is configured such that the gas container is thermally conductively connected with a burner part that is heated during operation. The thermally conductive connection is achieved via a thermally conductive housing that accommodates the gas container. This ensures a reliable burner operation despite an endothermic gas expansion in the gas container.

5 Claims, 2 Drawing Sheets

GAS STOVE, IN PARTICULAR FOR CAMPER VEHICLES

CROSS-REFERENCE TO RELATED APPLICATION

This application is a continuation of copending International Application No. PCT/EP01/12289, filed Oct. 24, 2001, which designated the United States and was not published in English.

BACKGROUND OF THE INVENTION

Field of the Invention

The invention relates generally to a gas stove and in particular to a gas stove for a camper vehicle.

Published, Non-Prosecuted German Patent Application No. DE 42 29 819 A1 discloses a conventional gas stove using a gas container in the form of a gas cylinder or a gas bottle. It is also conceivable to use a gas cartridge as the gas container in this case. The gas container is located in an accommodating chamber in a housing. The chamber is provided with a downwardly extending line or duct discharging into the open air. As has been found, the expansion of the gas leaving the gas container may result in the gas being overcooled to such an extent that the outlet location of the gas container may ice up and that the gas in the burner does not ignite. As a result, the burner cannot be operated.

German Utility Model No. G 87 12 254.5 U1 discloses a burner which can be operated with liquid fuel and is intended for a stove which, rather than being operated with kerosene, as has been customary hitherto, is to be operated with diesel fuel or fuel oil, that is to say with a liquid fuel which has higher-boiling constituents. There is a risk here that these constituents either do not evaporate at the prevailing temperatures or else that these constituents condense in a line leading from an evaporation chamber to a burner nozzle. In order to counter this, this document proposes providing, between corresponding parts within the burner, a good heat transfer between different constituent parts of the burner. German Utility Model No. G 87 12 254.5 U1 is not concerned with a liquid-fuel container that is subjected to positive pressure.

Published, Non-Prosecuted German Patent Application No. DE 36 33 809 A1 relates to a gas-cylinder warming device for gas-operated shrink-wrapping machines. In order to prevent the gas cylinders from icing up during operation, some of the waste air, which is produced during the shrink-wrapping of pallets, is drawn off and used for heating the gas cylinders. Drawing off waste air is not a feasible option in the case of a gas stove.

SUMMARY OF THE INVENTION

It is accordingly an object of the invention to provide a gas stove which overcomes the above-mentioned disadvantages of the heretofore-known gas stoves of this general type and which is protected against an operational disruption caused by the endothermic process of the expansion of the gas during or after it leaves the gas cylinder.

With the foregoing and other objects in view there is provided, in accordance with the invention, a gas stove, including:

a burner having a burner part heated during operation;

a housing having an accommodating chamber formed therein, the housing having a given housing region made of a thermally conductive material;

a gas container disposed in the accommodating chamber, the gas container containing gas under a positive pressure and supplying gas to the burner; and the gas container being in thermally conductive contact with the given housing region made of the thermally conductive material, and the gas container being in a thermally conductive connection with the burner part heated during operation.

Thus, in principle, rather than needing any additional devices, the invention only requires already existing devices to be configured in a specific manner. In particular, it is necessary that a region of the housing, which forms the accommodating chamber for the gas container, has a good thermally conductive contact at least with one region of the gas container. Also, this region of the housing must be configured to have a good thermal conductivity and must be in thermally conductive contact with a burner part which is heated during operation, for example the flame head. As a result, heat is transported from the heated burner part to the gas container and, by using this heat, the cooling associated with the gas expansion is reduced at least to an extent which does not impair the operation of the burner, in particular the ignition capability of the gas.

According to another feature of the invention, a resilient element is provided, which is configured to press the gas container elastically against the given housing region made of a thermally conductive material, such as metal.

According to yet another feature of the invention, the resilient element includes a cover for the accommodating chamber and a seal for the cover.

According to a further feature of the invention, the resilient element includes a cover for covering the accommodating chamber and a resilient supporting element; the cover carries the resilient supporting element; and the resilient supporting element supports the gas container.

According to yet a further feature of the invention, the gas container has a gas-outlet region and a given contour at the gas-outlet region; and the given housing region made of thermally conductive material has a contour adapted to the given contour at the gas-outlet region of the gas container such that an increased heat-transfer surface area is provided.

With the objects of the invention in view there is also provided, in a camper vehicle having a cooking facility, a gas stove, including:

a burner having a burner part heated during operation;

a housing having an accommodating chamber formed therein, the housing having a given housing region made of a thermally conductive material;

a gas container disposed in the accommodating chamber, the gas container containing gas under a positive pressure and supplying gas to the burner; and the gas container being in thermally conductive contact with the given housing region made of the thermally conductive material, and the gas container being in a thermally conductive connection with the burner part heated during operation.

Other features which are considered as characteristic for the invention are set forth in the appended claims.

Although the invention is illustrated and described herein as embodied in a gas stove, in particular for camper vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
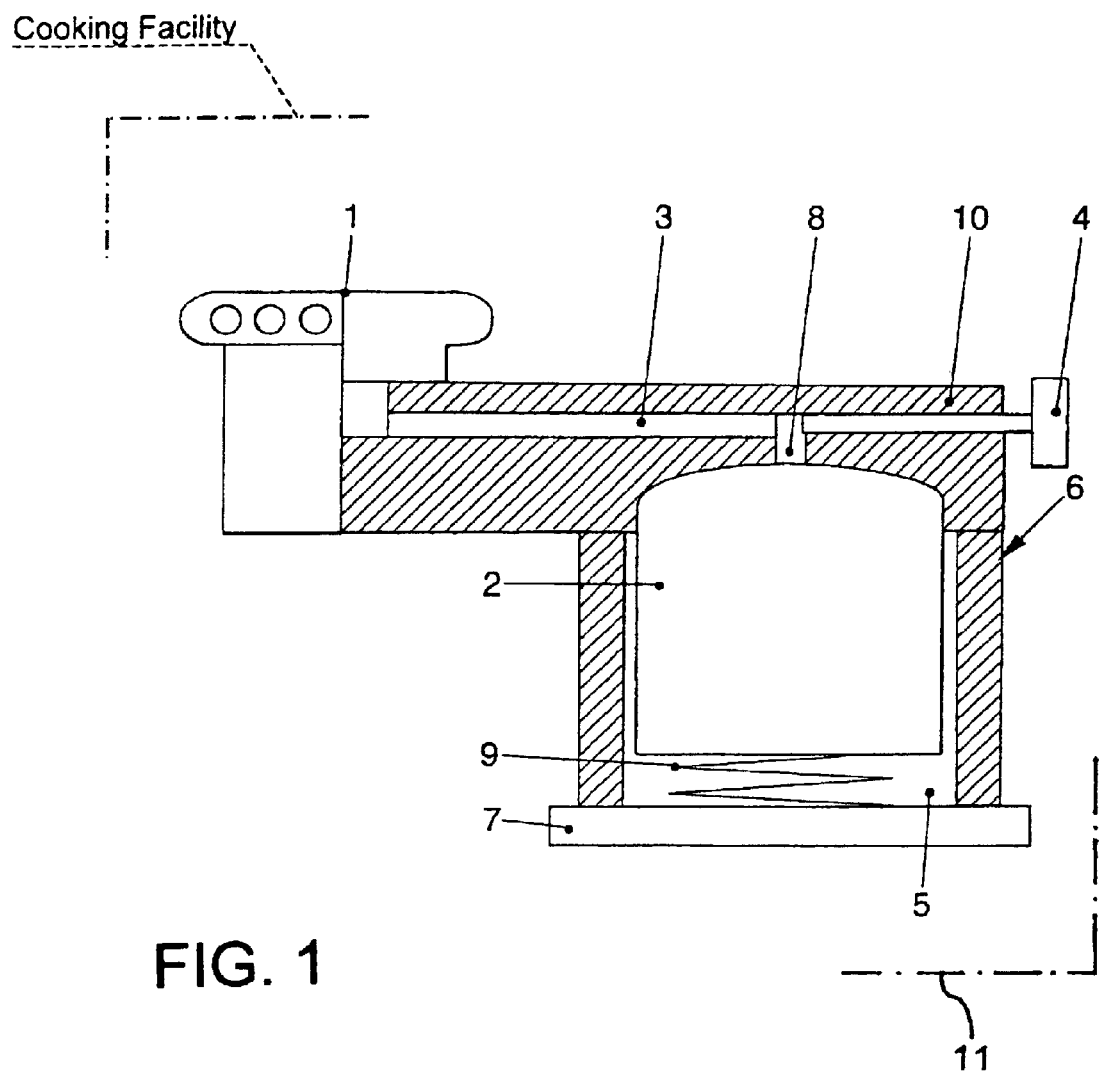
FIG. 1 is a diagrammatic, vertical sectional view of a first embodiment of a gas stove configuration according to the invention.

Referring now to the figures of the drawings in detail and first, particularly, to FIG. 1 thereof, there is shown a gas stove with a flame head 1 which is shown in half-section. The flame head 1 is heated during operation of the gas stove. The burner containing this flame head is supplied from the gas container 2, which may be a gas cylinder or gas bottle or a gas cartridge, with combustible gas via the gas duct 3. The gas supply may be adjusted with the valve 4. The gas container 2 is located in the accommodating chamber 5 in the housing 6. The accommodating chamber 5 is closed by the cover 7, which in this case is disposed at the bottom, wherein however, as described above, a connection between the accommodating chamber 5 and the surrounding atmosphere is provided.

At its top end, the gas container 2 has an outlet opening 8 which opens out into the gas duct 3. Since the gas in the container 2 is under positive pressure, pronounced cooling takes place during the expansion of the gas which enters into the gas duct 3. A local icing may occur as a result of this cooling. As has been found, this cooling impairs the ignition behavior of the gas in the gas burner, i.e. at the flame head 1.

In order to counter this problem, in this exemplary embodiment, the spring 9, which, with the cover 7 located in the operating position, presses against the base of the gas container 2, ensures a good thermally conductive contact between the top region of the gas container 2 and the part 10 of the housing 6. This housing part 10, which is formed of a material which is a good thermal conductor, preferably a metal, extends to the flame head 1 of the burner. Heat produced at the burner is thus conducted, via the housing part 10, to the top region of the gas container 2. As a result, the cooling, which takes place in the region of the gas-outlet location of the gas container 2 due to the expansion of the gas, is reduced at least to the extent where it does not have any adverse effect on the ignition capability of the gas in the gas burner.

Figure 2:
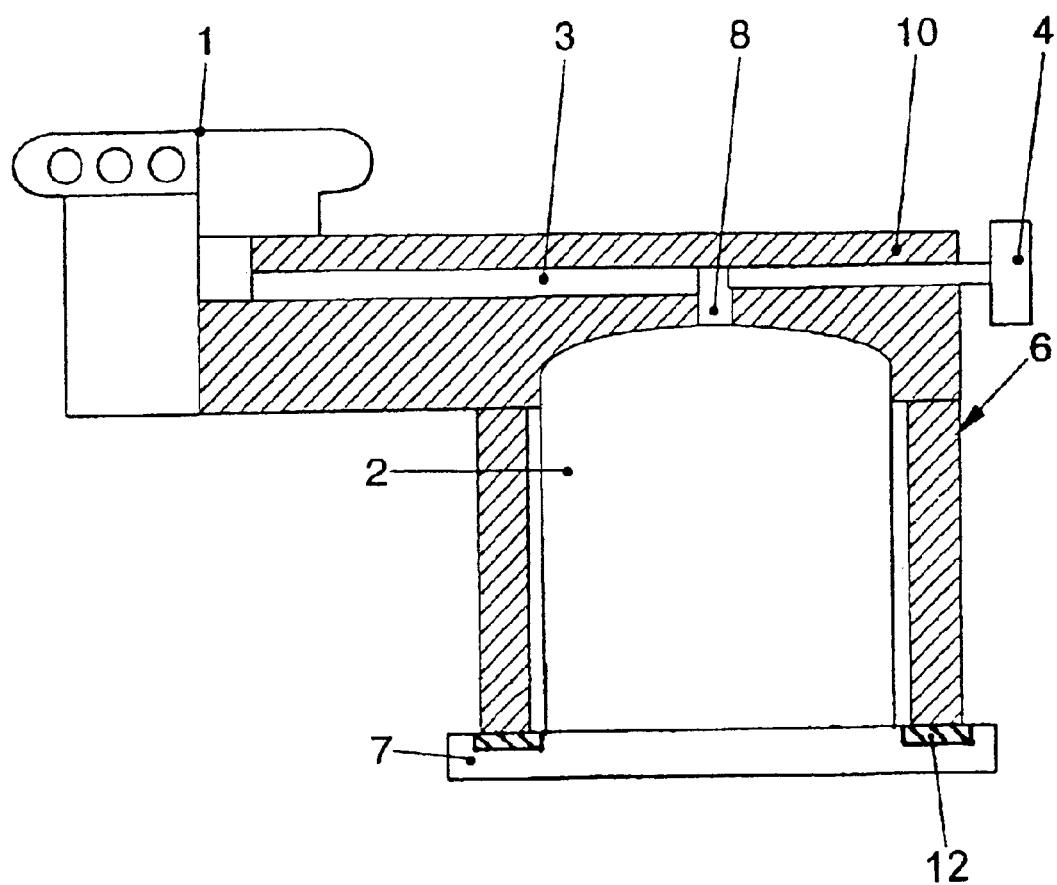
FIG. 2 is a diagrammatic, vertical sectional view of a second embodiment of a gas stove configuration according to the invention.

There are, of course, a large number of embodiments of the invention. For example, the spring 9 may be provided, for example, by an elastic bearing element on the cover 7. As shown in FIG. 2, another possibility is to utilize the elastic properties of a seal 12 between the cover 7 and the bottom edge of the housing 6. The heat transfer between the housing 6 and the gas cylinder 2 may also take place in some other region of the gas cylinder, although the solution illustrated in the figures, with the contours of the housing 6 and the gas container 2 adapted to one another in the top region, is particularly expedient because this is where the actual problem occurs, that is to say this is where the gas expands.

From the discussion of the prior art and the description of the invention, it becomes clear that the gas stove according to the invention is particularly suited for the use in a camper vehicle 11 (illustrated only as a dash-dotted line in FIG. 1). It is also clear from the description of the figures that the object of the invention is achieved with minimal additional outlay.

We claim:

1. A gas stove, comprising:

a burner having a burner part heated during operation;

a housing having an accommodating chamber formed therein, said housing having a given housing region made of a thermally conductive material;

a gas container disposed in said accommodating chamber, said gas container containing gas under a positive pressure and supplying gas to said burner;

said gas container being in thermally conductive contact with said given housing region made of said thermally conductive material, and said gas container being in a thermally conductive connection with said burner part heated during operation;

a resilient element configured to press said gas container elastically against said given housing region made of said thermally conductive material; and said resilient element including a cover for said accommodating chamber and a seal for said cover.

2. The gas stove according to claim 1, wherein:

said resilient element includes a resilient supporting element;

said cover carries said resilient supporting element; and said resilient supporting element supports said gas container.

3. The gas stove according to claim 1, wherein:

said gas container has a gas-outlet region and a given contour at said gas-outlet region; and said given housing region made of said thermally conductive material has a contour adapted to said given contour at said gas-outlet region of said gas container such that an increased heat-transfer surface area is provided.

4. The gas stove according to claim 1, wherein said given housing region is made of a metal.

5. In a camper vehicle having a cooking facility, a gas stove, comprising:

a burner having a burner part heated during operation;

a housing having an accommodating chamber formed therein, said housing having a given housing region made of a thermally conductive material;

a gas container disposed in said accommodating chamber, said gas container containing gas under a positive pressure and supplying gas to said burner; and said gas container being in thermally conductive contact with said given housing region made of said thermally conductive material, and said gas container being in a thermally conductive connection with said burner part heated during operation.

* * * * *